United States Patent

Nishina et al.

[11] Patent Number: 4,738,517
[45] Date of Patent: Apr. 19, 1988

[54] COPYING LENS WITH A WIDE ANGLE OF VIEW

[75] Inventors: Kiichiro Nishina, Tokyo; Taira Kouchiwa, Kanagawa, both of Japan

[73] Assignee: Ricoh Company, Ltd., Tokyo, Japan

[21] Appl. No.: 901,299

[22] Filed: Aug. 28, 1986

[30] Foreign Application Priority Data

Aug. 29, 1985 [JP] Japan ................................ 60-188634

[51] Int. Cl.⁴ ............................................... G02B 9/64
[52] U.S. Cl. ................................................ 350/464
[58] Field of Search ........................................ 350/464

[56] References Cited

U.S. PATENT DOCUMENTS 3,922,071 11/1975 Kitagawa et al. ................ 350/464

Primary Examiner—John K. Corbin
Assistant Examiner—Rebecca D. Gass
Attorney, Agent, or Firm—Oblon, Fisher, Spivak, McClelland & Maier

[57] ABSTRACT

A copying lens having a wide angle of view is of a six-component, eighth-element configuration which is completely symmetrical with respect to an aperture stop. The first component is composed of a convex-meniscus lens having a convex surface directed toward the object side, and the second component is composed of a concave-meniscus lens having a convex surface directed toward the object side. The third component is composed of a double-convex lens and a double-concave lens which are joined to each other, with the double-convex lens being closer to the object side. The fourth, fifth, and sixth components are substantially same as the third, second, and first components. The fourth and third components, the fifth and second groups, and the sixth and first components are symmetrical with respect to the aperture stop. The copying lens meets the following conditions:

(i) $0.45 < f/f_{1,2} < 0.6$;
(ii) $0.1 < f/f_{3,4} < 0.25$
(iii) $0.1 < n_4 - n_3 < 0.3$;
(iv) $15 < \nu_3 - \nu_4 < 30$; and
(v) $1.70 < n_1$, $50 < \nu_1$, where f: the combined focal length of the overall lens system,
$f_{1,2}$: the combined focal length of the first lens (eighth lens) and the second lens (seventh lens),
$f_{3,4}$: the combined focal length of the third lens (sixth lens) and the fourth lens (fifth lens),
$n_i$: the refractive index of the ith lens, and
$\nu_i$: the Abbe number of the ith lens.

1 Claim, 19 Drawing Sheets

F I G. 14
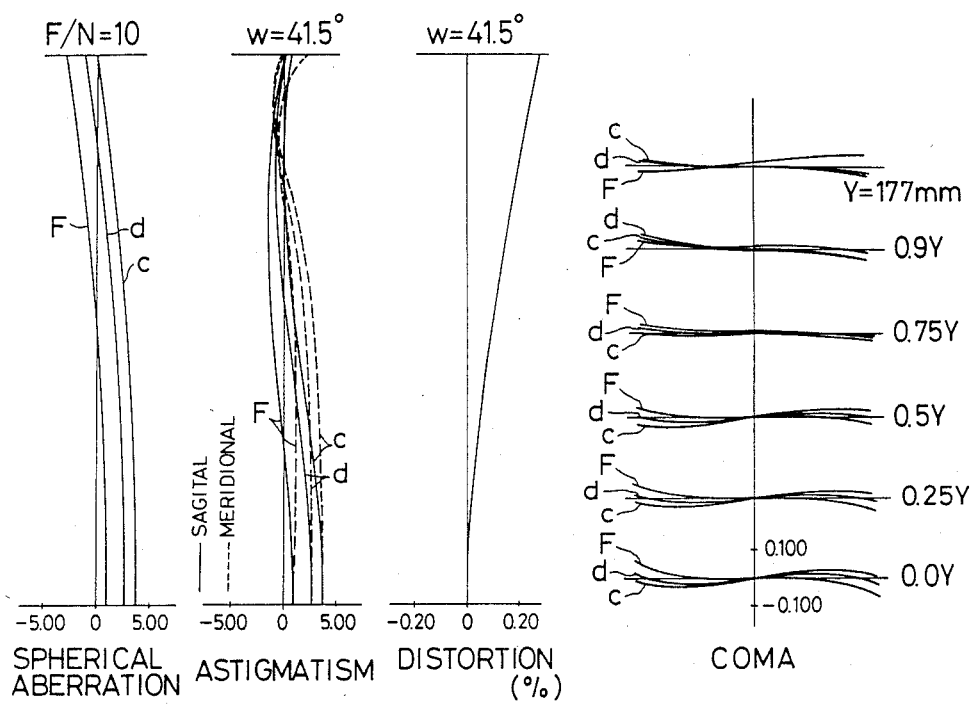
F I G. 15
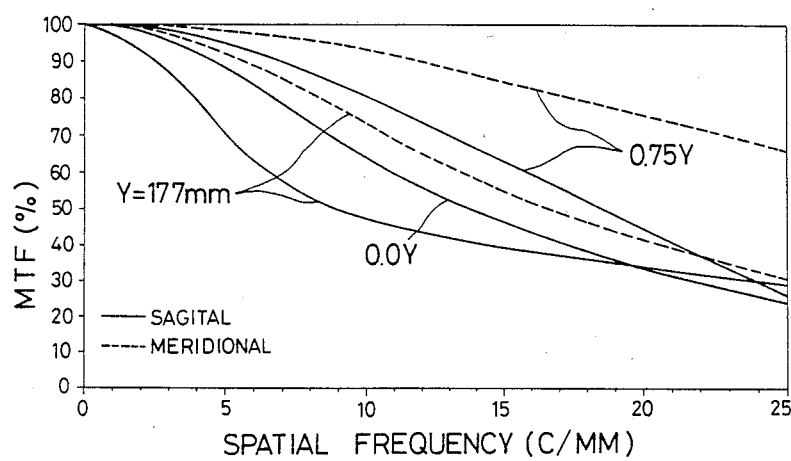

F I G. 24
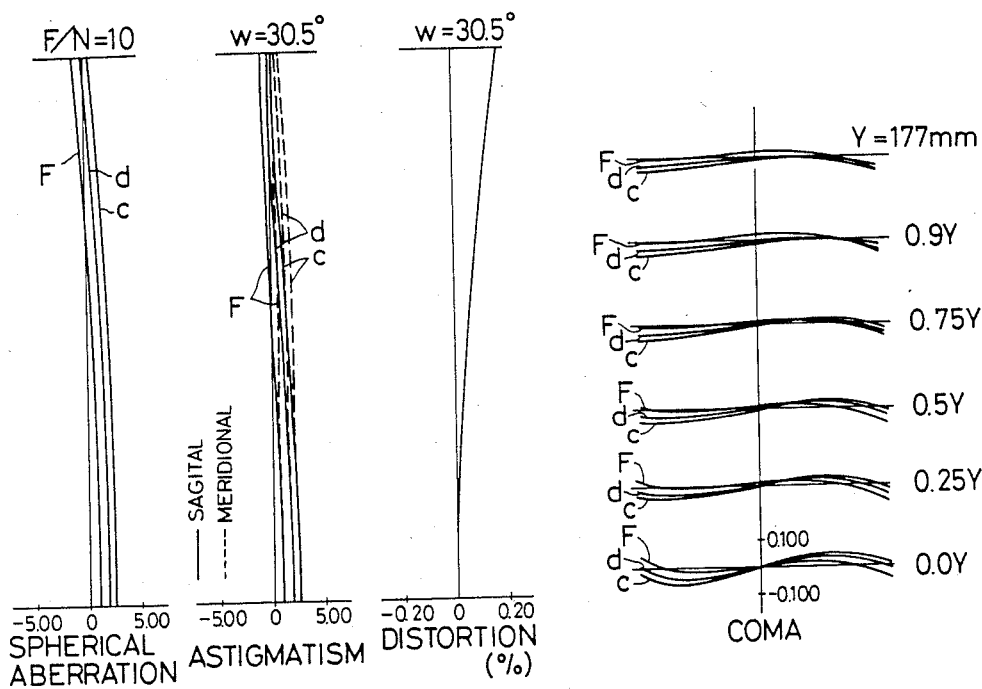
F I G. 25
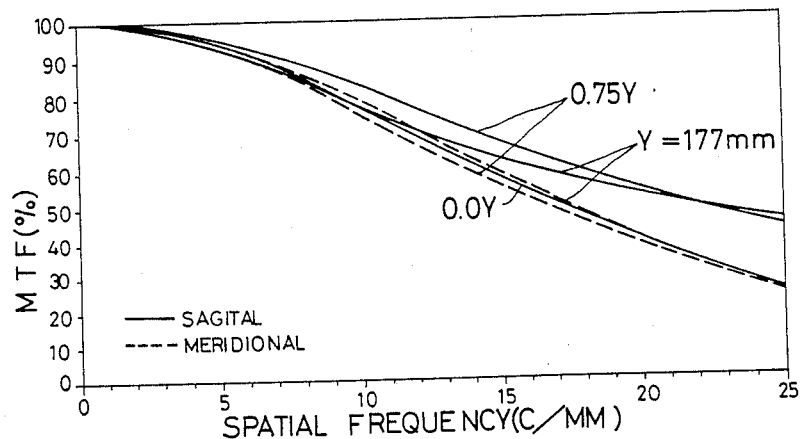

F I G. 32
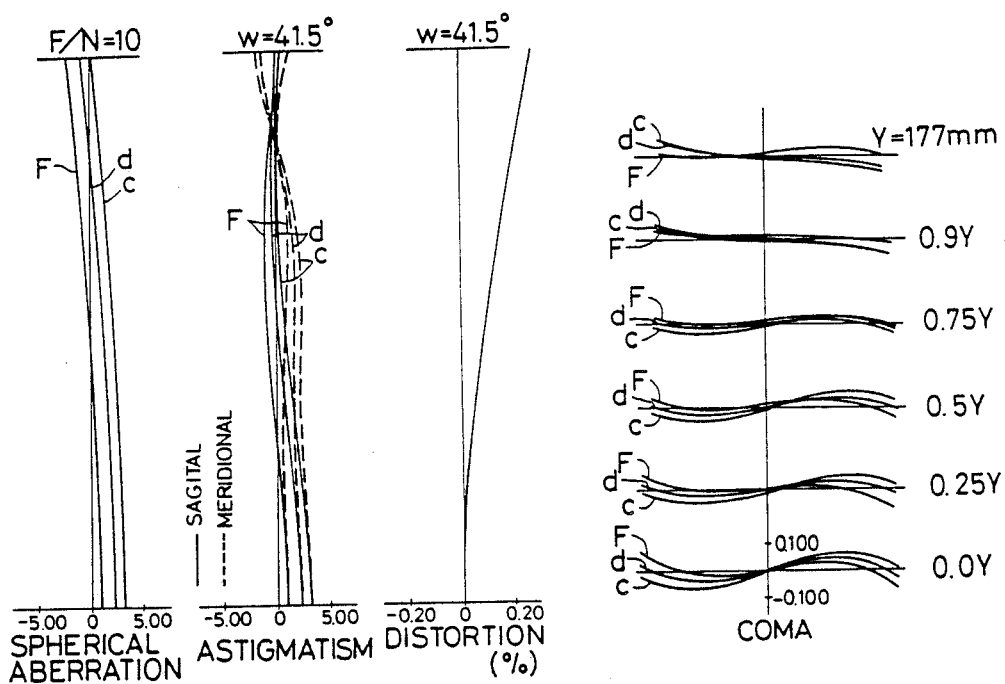
F I G. 33
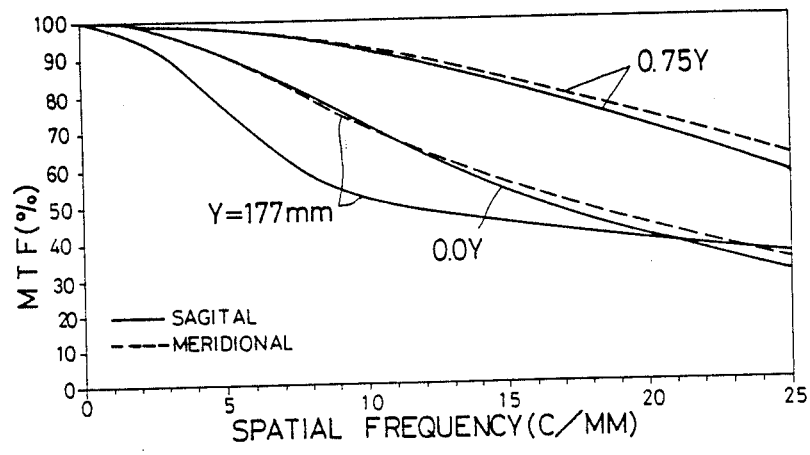

COPYING LENS WITH A WIDE ANGLE OF VIEW

BACKGROUND OF THE INVENTION

1. Field of the Invention

The present invention relates to a copying lens of completely symmetric configuration, and more particularly to a copying lens having a half angle of view exceeding 40°.

2. Description of the Prior Art

Copying machines, electrostatic copiers, and the like are becoming smaller in size, and there are demands for lenses of a wider angle of view for use in such copying machines. Copying lenses of wide angles of view which have heretofore been developed have half angles of view up to about 34°. If an original of an A3 size is to be copied by a copying machine of the full exposure type that incorporates such a copying lens, the congugate length is too long, and the optical path must be bent by a mirror or the like. This had led to a cost increase and prevented the copying machine from being designed for a smaller size.

Japanese Laid-Open Patent Publication No. 55 (1980)-90930, for example, discloses a copying lens comprising eight lens elements. The disclosed copying lens has a half angle of view which is about 20°. If the half angle of view were increased up to 40°, the curvature of field would be highly increased, and the lens would not have good performance.

SUMMARY OF THE INVENTION

It is an object of the present invention to provide a copying lens having a half angle of view exceeding 40° with its image-forming performance not lowered even when the magnifying power thereof varies in the range of from 1.414 to 0.5.

Where a copying lens has such a wide angle of view that the half angle of view exceeds 40°, it becomes more difficult to reduce the curvature of field, and distortion and chromatic aberration on the image field which are caused by a contact glass plate and which have not been problematic with a copying lens that has a half angle of view of about 34° become so bad that they must be corrected.

According to the present invention, a copying lens is of a six-component, eight-element configuration including a basic TOPOGON-type four-component, four-element lens having a wide angle of view, and cemented lens components for reducing distortion and magnification-dependent chromatic aberration.

The copying lens is a six-component, eight-element configuration comprising, in order from an object side, a first component composed of a convex-meniscus first lens having a convex surface directed toward the object side, a second component composed of a concave-meniscus second lens having a convex surface directed toward the object side, a third component composed of a double-convex third lens and a double-concave fourth lens which are joined to each other, an aperture stop, a fourth component composed of a double-concave fifth lens which is substantially the same as the fourth lens and a double-convex sixth lens which is substantially the same the third lens, the fifth and sixth lenses being joined to each other, a fifth component composed of a concave-meniscus seventh lens which is substantially the same as the second lens and has a concave surface directed to the object side, and a sixth component composed of a convex-meniscus eighth lens which is substantially the same as the first lens and has a concave surface directed to the object side, the copying lens being completely symmetrical with respect to the aperture stop and meeting the following conditions:

(i) $0.45 < f/f_{1,2} < 0.6$
(ii) $0.1 < f/f_{3,4} < 0.25$
(iii) $0.1 < n_4 - n_3 < 0.3$
(iv) $15 < \nu_3 - \nu_4 < 30$
(v) $1.70 < n_1$
    $50 < \nu_1$ where f: the combined focal length of the overall lens system,
$f_{1,2}$: the combined focal length of the first lens (eighth lens) and the second lens (seventh lens),
$f_{3,4}$: the combined focal length of the third lens (sixth lens) and the fourth lens (fifth lens),
$n_i$: the refractive index of the ith lens, and
$\nu_i$: the Abbe number of the ith lens.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 14 through 19 are abberation and MTF diagrams of Example 3, FIGS. 14 and 15 showing those on no size magnification, FIGS. 16 and 17 showing those on size enlargement, FIGS. 18 and 19 showing those on size reduction;

FIGS. 20 through 25 are abberation and MTF diagrams of Example 4, FIGS. 20 and 21 showing those on no size magnification, FIGS. 22 and 23 showing those on size enlargement, FIGS. 24 and 25 showing those on size reduction;

FIGS. 32 through 37 are abberation and MTF diagrams of Example 6, FIGS. 32 and 33 showing those on no size magnification, FIGS. 34 and 35 showing those on size enlargement, FIGS. 36 and 37 showing those on size reduction.

DESCRIPTION OF THE PREFERRED EMBODIMENT

Figure 1:
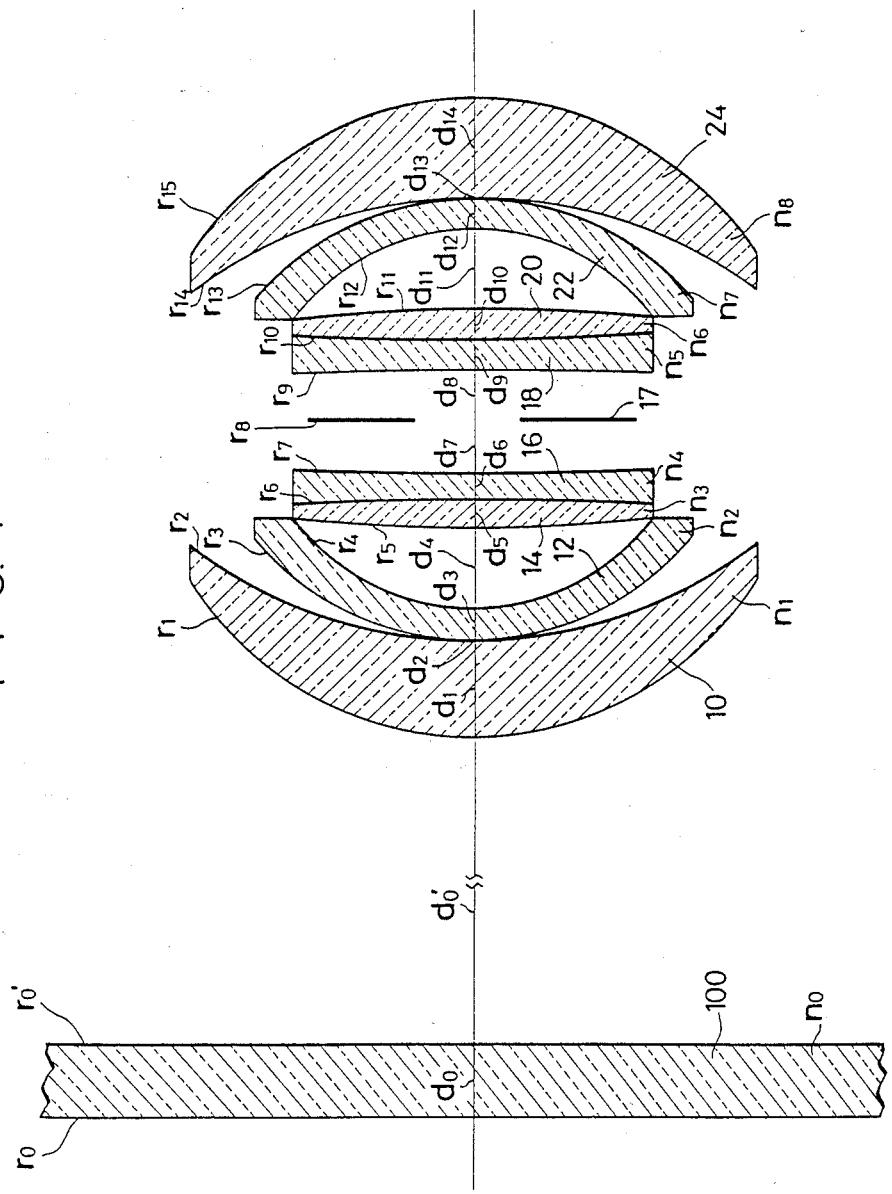
FIG. 1 is a cross-sectional view of a copying lens according to the present invention.

As shown in FIG. 1, a copying lens according to the present invention is a six-component, eight-element configuration comprising, in order from an object side (from the left in FIG. 1), a first component composed of a convex-meniscus first lens 10 having a convex surface directed toward the object side, a second component composed of a concave-meniscus second lens 12 having a convex surface directed toward the object side, a third component composed of a double-convex third lens 14 and a double-concave fourth lens 16 which are joined to each other, an aperture stop 17, a fourth component composed of a double-concave fifth lens 18 which is substantially the same as the fourth lens 16 and a double-convex sixth lens 20 which is substantially the same as the third lens 14, the fifth and sixth lenses 18, 20 being joined to each other, a fifth component composed of a concave-meniscus seventh lens 22 which is substantially the same as the second lens 12 and has a concave surface directed to the object side, and a sixth component composed of a convex-meniscus eighth lens 24 which is substantially the same as the first lens 10 and has a concave surface directed to the object side, the copying lens being completely symmetrical with respect to the aperture stop 17 and meeting the following conditions:

(i) $0.45 < f/f_{1,2} < 0.6$
(ii) $0.1 < f/f_{3,4} < 0.25$
(iii) $0.1 < n_4 - n_3 < 0.3$
(iv) $15 < \nu_3 - \nu_4 < 30$
(v) $1.70 < n_1$
    $50 < \nu_1$ where $f$: the combined focal length of the overall lens system, $f_{1,2}$: the combined focal length of the first lens (eighth lens) and the second lens (seventh lens), $f_{3,4}$: the combined focal length of the third lens (sixth lens) and the fourth lens (fifth lens), $n_i$: the refractive index of the ith lens, and $\nu_i$: the Abbe number of the ith lens.

Designated at 100 in FIG. 1 is a contact lens plate.

The conditions (i) through (v) met by the copying lens of the present invention will be described below in detail.

If the upper limit of the condition (i) were exceeded to increase the combined power of the first and second lenses 10, 12 (the eighth and seventh lenses 24, 22), the Petzval sum would be too negative, causing the image plane or field to fall in a positive direction, and the curvature of a saggital ray of astigmatism would be increased. If the lower limit of the condition (i) were exceeded, the Petzval sum would be too large positively, causing the image plane to fall in a negative direction, and the astigmatism would be increased and no optimum image position would be available on the entire image plane. This would cause MTF to be lowered.

The condition (ii) is related to the power of the third group (fourth group). If the upper limit of the condition (ii) would be exceeded, the spherical aberration would be negative and the image plane would be positive. If the lower limit of the condition (ii) would be exceeded, the spherical aberration would be positive and the image plane would be negative. On- and off-axis spherical aberrations and image planes would be so brought out of balance that they could not be corrected by other parameters, and the lens would not have a wide angle of view.

If the upper limit of the condition (iii) were exceeded, the radii of curvature of both of the concave surfaces of the fourth lens (fifth lens) would be excessively large in order to meet the condition (ii). At the time of varying the magnifying power, especially for size reduction, the distortion would be increased positively. If the lower limit of the condition (iii) were exceeded, the curvature of a saggital ray of astigmatism would be increased, making it difficult to give a wide angle of view to the lens.

The condition (iv) is mainly concerned with the correction of chromatic aberration of the image plane at the time of not varying the magnifying power. This condition serves to prevent a reduction of MTF due to a large difference between wavelength-dependent image-forming points arising from the large half angle of view which is about 40°. If the upper limit of the condition (iv) were exceeded, the chromatic aberration would be excessively large positively in shorter wavelengths, for example, F line. If the lower limit of the condition (iv) were exceeded, the chromatic aberration would be excessively large negatively in shorter wavelengths.

The condition (v) is related to magnification-dependent chromatic aberration and saggital curvature at the time of varying the magnifying power. If the range of this condition (v) were exceeded, the magnification-dependent chromatic aberration would become large negatively in shorter wavelengths, and the curvature of a saggital ray would be increased, with the result that the copying lens would not have a wide angle of view.

Six specific examples will be described below. In each of the examples, designated at $r_i$ is the radius of curvature of the ith refracting surface as counted from an object side, $d_i$ is the ith surface-to-surface distance, $\omega$ is the half angle of view, F/N is the F number, Y is the height of an object, m is the magnification, $r_0$, $r_0'$ are the radii of curvature of the surfaces of the contact glass plate which face the object and the lens, $d_0$ is the thickness of the contact lens plate, $d_0'$ is the surface-to-surface distance between the contact glass plate and the first surface, and $n_0$, $\nu_0$ are the refractive index and the Abbe number, respectively, of the contact glass. In each of the examples, the value of $d_0'$ indicates that when the magnifying power is not varied.

EXAMPLE 1

| f = 100 mm, ω = 41.5°, F/N = 10, Y = 177 mm |||| 
| --- | --- | --- | --- |
| m = x 0.5 — x 1.414, $f_{1,2}$ = 198.18 mm, $f_{3,4}$ = 563.58 mm |||| 
| $r_0 = \infty$ | $d_0 = 5.0$ | $n_0 = 1.51633$ | $\nu_0 = 64.1$ |
| $r_0' = \infty$ | $d_0' = 172.668$ | | |
| $r_1 = 20.546$ | $d_1 = 4.847$ | $n_1 = 1.74100$ | $\nu_1 = 52.7$ |
| $r_2 = 26.047$ | $d_2 = 0.183$ | | |
| $r_3 = 16.447$ | $d_3 = 2.001$ | $n_2 = 1.69895$ | $\nu_2 = 30.1$ |
| $r_4 = 13.480$ | $d_4 = 5.879$ | | |
| $r_5 = 87.291$ | $d_5 = 2.046$ | $n_3 = 1.47069$ | $\nu_3 = 67.4$ |
| $r_6 = -95.836$ | $d_6 = 2.708$ | $n_4 = 1.62374$ | $\nu_4 = 47.1$ |
| $r_7 = 302.589$ | $d_7 = 2.752$ | | |
| $r_8 = \infty$ (aperture) | $d_8 = 2.752$ | | |
| $r_9 = -302.589$ | $d_9 = 2.708$ | $n_5 = 1.62374$ | $\nu_5 = 47.1$ |
| $r_{10} = 95.836$ | $d_{10} = 2.046$ | $n_6 = 1.47069$ | $\nu_6 = 67.4$ |
| $r_{11} = -87.291$ | $d_{11} = 5.879$ | | |
| $r_{12} = -13.480$ | $d_{12} = 2.001$ | $n_7 = 1.69895$ | $\nu_7 = 30.1$ |
| $r_{13} = -16.447$ | $d_{13} = 0.183$ | | |
| $r_{14} = -26.047$ | $d_{14} = 4.847$ | $n_8 = 1.74100$ | $\nu_8 = 52.7$ |
| $r_{15} = -20.546$ | | | |
| $f/f_{1,2} = 0.505$ |||| 
| $f/f_{3,4} = 0.177$ |||| 
| $(n_4 - n_3) = 0.15305$ |||| 
| $(\nu_3 - \nu_4) = 20.3$ |||| 
| $n_1 = 1.74100$ | | $\nu_1 = 52.7$ ||

EXAMPLE 2

| f = 100 mm, ω = 41.5°, F/N = 10, Y = 177 mm |
| --- |
| m = x 0.5 − x 1.414, $f_{1,2}$ = 199.22 mm, $f_{3,4}$ = 561.64 mm |

| | | | |
|---|---|---|---|
| $r_0 = \infty$ | $d_0 = 5.0$ | $n_0 = 1.51633$ | $\nu_0 = 64.1$ |
| $r_0' = \infty$ | $d_0' = 173.129$ | | |
| $r_1 = 20.378$ | $d_1 = 4.928$ | $n_1 = 1.74100$ | $\nu_1 = 52.7$ |
| $r_2 = 26.359$ | $d_2 = 0.068$ | | |
| $r_3 = 17.241$ | $d_3 = 2.0$ | $n_2 = 1.69895$ | $\nu_2 = 30.1$ |
| $r_4 = 13.834$ | $d_4 = 5.216$ | | |
| $r_5 = 96.444$ | $d_5 = 2.354$ | $n_3 = 1.46450$ | $\nu_3 = 66.0$ |
| $r_6 = -89.888$ | $d_6 = 2.705$ | $n_4 = 1.62374$ | $\nu_4 = 47.1$ |
| $r_7 = 481.816$ | $d_7 = 2.899$ | | |
| $r_8 = \infty$ | $d_8 = 2.899$ | | |
| (aperture) | | | |
| $r_9 = -481.816$ | $d_9 = 2.705$ | $n_5 = 1.62374$ | $\nu_5 = 47.1$ |
| $r_{10} = 89.888$ | $d_{10} = 2.354$ | $n_6 = 1.46450$ | $\nu_6 = 66.0$ |
| $r_{11} = -96.444$ | $d_{11} = 5.216$ | | |
| $r_{12} = -13.834$ | $d_{12} = 2.0$ | $n_7 = 1.69895$ | $\nu_7 = 30.1$ |
| $r_{13} = -17.241$ | $d_{13} = 0.068$ | | |
| $r_{14} = -26.359$ | $d_{14} = 4.928$ | $n_8 = 1.74100$ | $\nu_8 = 52.7$ |
| $r_{15} = -20.378$ | | | |

$f/f_{1,2} = 0.502$
$f/f_{3,4} = 0.178$
$(n_4 - n_3) = 0.15924$
$(\nu_3 - \nu_4) = 18.9$
$n_1 = 1.74100 \quad \nu_1 = 52.7$

EXAMPLE 3

| f = 100 mm, ω = 41.5°, F/N = 10, Y = 177 mm |
| --- |
| m = x 0.5 − x 1.414, $f_{1,2}$ = 200.22 mm, $f_{3,4}$ = 552.22 mm |

| | | | |
|---|---|---|---|
| $r_0 = \infty$ | $d_0 = 5.0$ | $n_0 = 1.51633$ | $\nu_0 = 64.1$ |
| $r_0' = \infty$ | $d_0' = 173.314$ | | |
| $r_1 = 20.372$ | $d_1 = 4.971$ | $n_1 = 1.74100$ | $\nu_1 = 52.7$ |
| $r_2 = 26.532$ | $d_2 = 0.123$ | | |
| $r_3 = 17.540$ | $d_3 = 2.001$ | $n_2 = 1.69895$ | $\nu_2 = 30.1$ |
| $r_4 = 13.967$ | $d_4 = 5.050$ | | |
| $r_5 = 90.826$ | $d_5 = 2.079$ | $n_3 = 1.46450$ | $\nu_3 = 66.0$ |
| $r_6 = -111.706$ | $d_6 = 2.714$ | $n_4 = 1.63930$ | $\nu_4 = 44.9$ |
| $r_7 = 360.541$ | $d_7 = 3.076$ | | |
| $r_8 = \infty$ | $d_8 = 3.076$ | | |
| (aperture) | | | |
| $r_9 = -360.541$ | $d_9 = 2.714$ | $n_5 = 1.63930$ | $\nu_5 = 44.9$ |
| $r_{10} = 111.706$ | $d_{10} = 2.079$ | $n_6 = 1.46450$ | $\nu_6 = 66.0$ |
| $r_{11} = -90.826$ | $d_{11} = 5.050$ | | |
| $r_{12} = -13.967$ | $d_{12} = 2.001$ | $n_7 = 1.69895$ | $\nu_7 = 30.1$ |
| $r_{13} = -17.540$ | $d_{13} = 0.123$ | | |
| $r_{14} = -26.532$ | $d_{14} = 4.971$ | $n_8 = 1.74100$ | $\nu_8 = 52.7$ |
| $r_{15} = -20.372$ | | | |

$f/f_{1,2} = 0.499$
$f/f_{3,4} = 0.181$
$(n_4 - n_3) = 0.1748$
$(\nu_3 - \nu_4) = 21.1$
$n_1 = 1.74100 \quad \nu_1 = 52.7$

EXAMPLE 4

| f = 100 mm, ω = 41.5°, F/N = 10, Y = 177 mm |
| --- |
| m = x 0.5 − x 1.414, $f_{1,2}$ = 198.40 mm, $f_{3,4}$ = 564.43 mm |

| | | | |
|---|---|---|---|
| $r_0 = \infty$ | $d_0 = 5.0$ | $n_0 = 1.51633$ | $\nu_0 = 64.1$ |
| $r_0' = \infty$ | $d_0' = 173.080$ | | |
| $r_1 = 20.423$ | $d_1 = 4.969$ | $n_1 = 1.74100$ | $\nu_1 = 52.7$ |
| $r_2 = 26.681$ | $d_2 = 0.113$ | | |
| $r_3 = 17.448$ | $d_3 = 2.0$ | $n_2 = 1.71736$ | $\nu_2 = 29.5$ |
| $r_4 = 13.949$ | $d_4 = 5.115$ | | |
| $r_5 = 92.403$ | $d_5 = 2.051$ | $n_3 = 1.46450$ | $\nu_3 = 66.0$ |
| $r_6 = -111.971$ | $d_6 = 2.762$ | $n_4 = 1.63930$ | $\nu_4 = 44.9$ |
| $r_7 = 370.106$ | $d_7 = 3.080$ | | |
| $r_8 = \infty$ | $d_8 = 3.080$ | | |
| (aperture) | | | |
| $r_9 = -370.106$ | $d_9 = 2.762$ | $n_5 = 1.63930$ | $\nu_5 = 44.9$ |
| $r_{10} = 111.971$ | $d_{10} = 2.051$ | $n_6 = 1.46450$ | $\nu_6 = 66.0$ |
| $r_{11} = -92.403$ | $d_{11} = 5.115$ | | |
| $r_{12} = -13.949$ | $d_{12} = 2.0$ | $n_7 = 1.71736$ | $\nu_7 = 29.5$ |
| $r_{13} = -17.448$ | $d_{13} = 0.113$ | | |
| $r_{14} = -26.681$ | $d_{14} = 4.969$ | $n_8 = 1.74100$ | $\nu_8 = 52.7$ |
| $r_{15} = -20.423$ | | | |

$f/f_{1,2} = 0.504$
$f/f_{3,4} = 0.177$
$(n_4 - n_3) = 0.1748$
$(\nu_3 - \nu_4) = 21.1$
$n_1 = 1.74100 \quad \nu_1 = 52.7$

EXAMPLE 5

| f = 100 mm, ω = 41.5°, F/N = 10, Y = 177 mm |
| --- |
| m = x 0.5 − x 1.414, $f_{1,2}$ = 183.45 mm, $f_{3,4}$ = 666.26 mm |

| | | | |
|---|---|---|---|
| $r_0 = \infty$ | $d_0 = 5.0$ | $n_0 = 1.51633$ | $\nu_0 = 64.1$ |
| $r_0' = \infty$ | $d_0' = 170.252$ | | |
| $r_1 = 21.692$ | $d_1 = 5.850$ | $n_1 = 1.74100$ | $\nu_1 = 52.7$ |
| $r_2 = 27.904$ | $d_2 = 0.187$ | | |
| $r_3 = 16.995$ | $d_3 = 2.001$ | $n_2 = 1.71736$ | $\nu_2 = 29.5$ |
| $r_4 = 13.971$ | $d_4 = 5.756$ | | |
| $r_5 = 96.909$ | $d_5 = 2.135$ | $n_3 = 1.46450$ | $\nu_3 = 66.0$ |
| $r_6 = -137.731$ | $d_6 = 2.992$ | $n_4 = 1.66755$ | $\nu_4 = 41.9$ |
| $r_7 = 360.391$ | $d_7 = 3.107$ | | |
| $r_8 = \infty$ | $d_8 = 3.107$ | | |
| (aperture) | | | |
| $r_9 = -360.391$ | $d_9 = 2.992$ | $n_5 = 1.66755$ | $\nu_5 = 41.9$ |
| $r_{10} = 137.731$ | $d_{10} = 2.135$ | $n_6 = 1.46450$ | $\nu_6 = 66.0$ |
| $r_{11} = -96.909$ | $d_{11} = 5.756$ | | |
| $r_{12} = -13.971$ | $d_{12} = 2.001$ | $n_7 = 1.71736$ | $\nu_7 = 29.5$ |
| $r_{13} = -16.995$ | $d_{13} = 0.187$ | | |
| $r_{14} = -27.904$ | $d_{14} = 5.850$ | $n_8 = 1.74100$ | $\nu_8 = 64.1$ |
| $r_{15} = -21.692$ | | | |

$f/f_{1,2} = 0.545$
$f/f_{3,4} = 0.150$
$(n_4 - n_3) = 0.20305$
$(\nu_3 - \nu_4) = 24.1$
$n_1 = 1.74100 \quad \nu_1 = 52.7$

EXAMPLE 6

| f = 100 mm, ω = 41.5°, F/N = 10, Y = 177 mm |
| --- |
| m = x 0.5 − x 1.414, $f_{1,2}$ = 181.14 mm, $f_{3,4}$ = 699.19 mm |

| | | | |
|---|---|---|---|
| $r_0 = \infty$ | $d_0 = 5.0$ | $n_0 = 1.51633$ | $\nu_0 = 64.1$ |
| $r_0' = \infty$ | $d_0' = 171.649$ | | |
| $r_1 = 21.434$ | $d_1 = 6.161$ | $n_1 = 1.74100$ | $\nu_1 = 52.7$ |
| $r_2 = 29.285$ | $d_2 = 0.209$ | | |
| $r_3 = 18.337$ | $d_3 = 2.001$ | $n_2 = 1.71736$ | $\nu_2 = 29.5$ |
| $r_4 = 14.334$ | $d_4 = 5.219$ | | |
| $r_5 = 98.276$ | $d_5 = 2.067$ | $n_3 = 1.46450$ | $\nu_3 = 66.0$ |
| $r_6 = -146.801$ | $d_6 = 1.959$ | $n_4 = 1.70154$ | $\nu_4 = 41.2$ |
| $r_7 = 410.284$ | $d_7 = 3.332$ | | |
| $r_8 = \infty$ | $d_8 = 3.332$ | | |
| (aperture) | | | |
| $r_9 = -410.284$ | $d_9 = 1.959$ | $n_5 = 1.70154$ | $\nu_5 = 41.2$ |
| $r_{10} = 146.801$ | $d_{10} = 2.067$ | $n_6 = 1.46450$ | $\nu_6 = 66.0$ |
| $r_{11} = -98.276$ | $d_{11} = 5.219$ | | |
| $r_{12} = -14.334$ | $d_{12} = 2.001$ | $n_7 = 1.71736$ | $\nu_7 = 29.5$ |
| $r_{13} = -18.337$ | $d_{13} = 0.209$ | | |
| $r_{14} = -29.285$ | $d_{14} = 6.161$ | $n_8 = 1.74100$ | $\nu_8 = 52.7$ |
| $r_{15} = -21.434$ | | | |

$f/f_{1,2} = 0.552$
$f/f_{3,4} = 0.143$
$(n_4 - n_3) = 0.23704$
$(\nu_3 - \nu_4) = 24.8$
$n_1 = 1.74100 \quad \nu_1 = 52.7$ Aberrations and MTF characteristics for Examples 1 through 6 are illustrated in FIGS. 2 through 37. Even-numbered figures show aberrations, whereas odd-numbered figures illustrate MTF characteristics. The MTF diagrams should be combined with those aberration diagrams which are immediately prior thereto.

Figure 2:
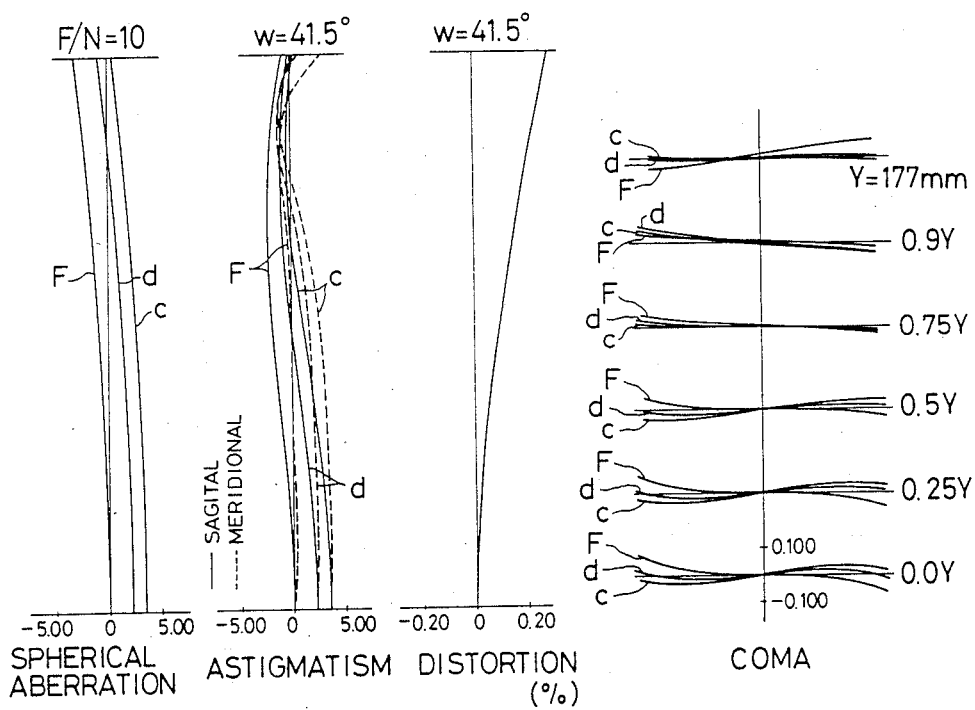
FIGS. 2 through 7 are abberation and MTF diagrams of Example 1, FIGS. 2 and 3 showing those on no size magnification, FIGS. 4 and 5 showing those on size enlargement, FIGS. 6 and 7 showing those on size reduction.
Figure 3:
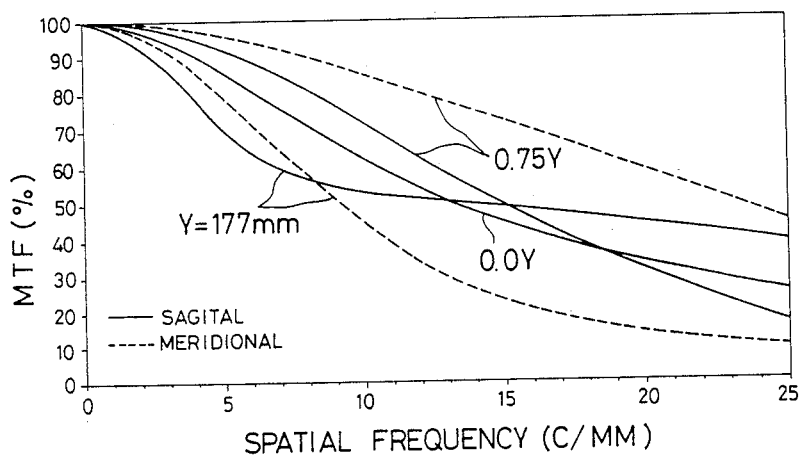
Figure 4:
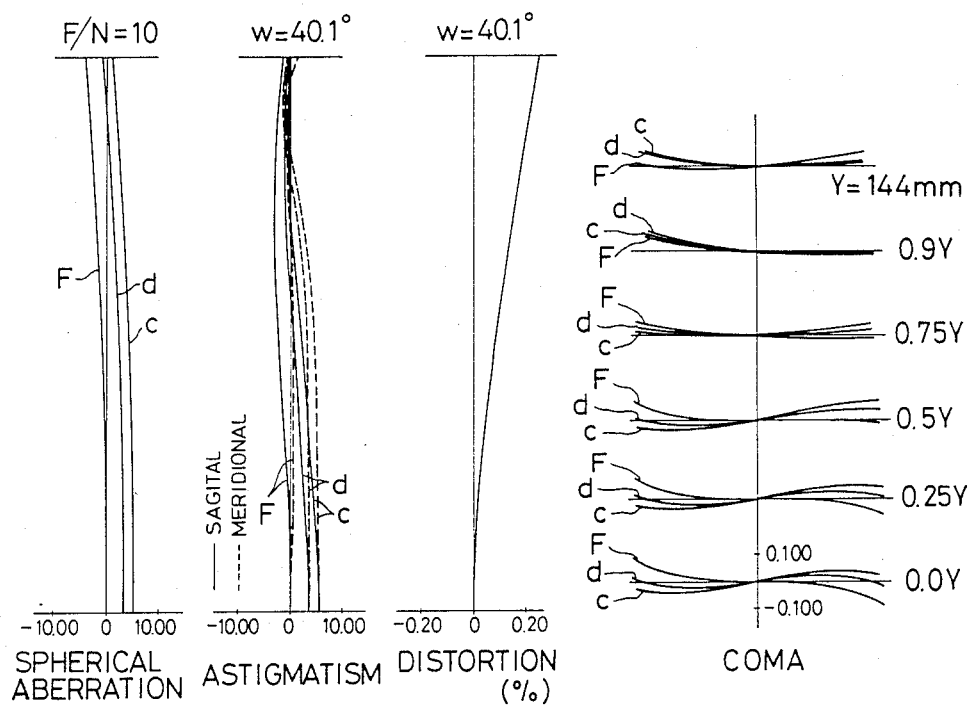
Figure 5:
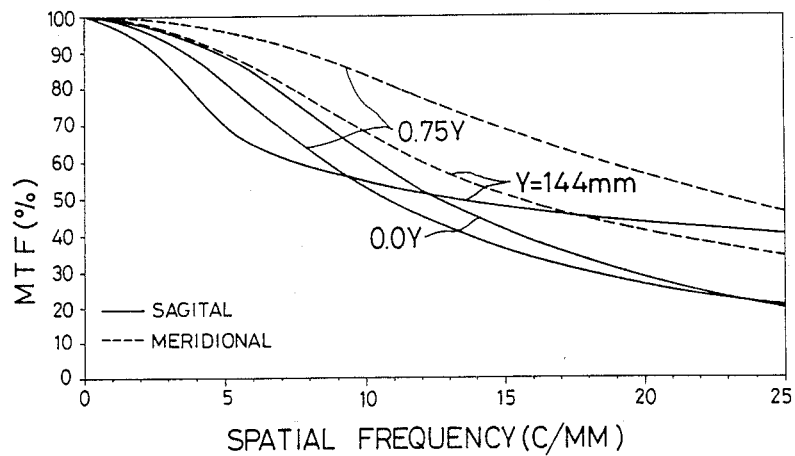
Figure 6:
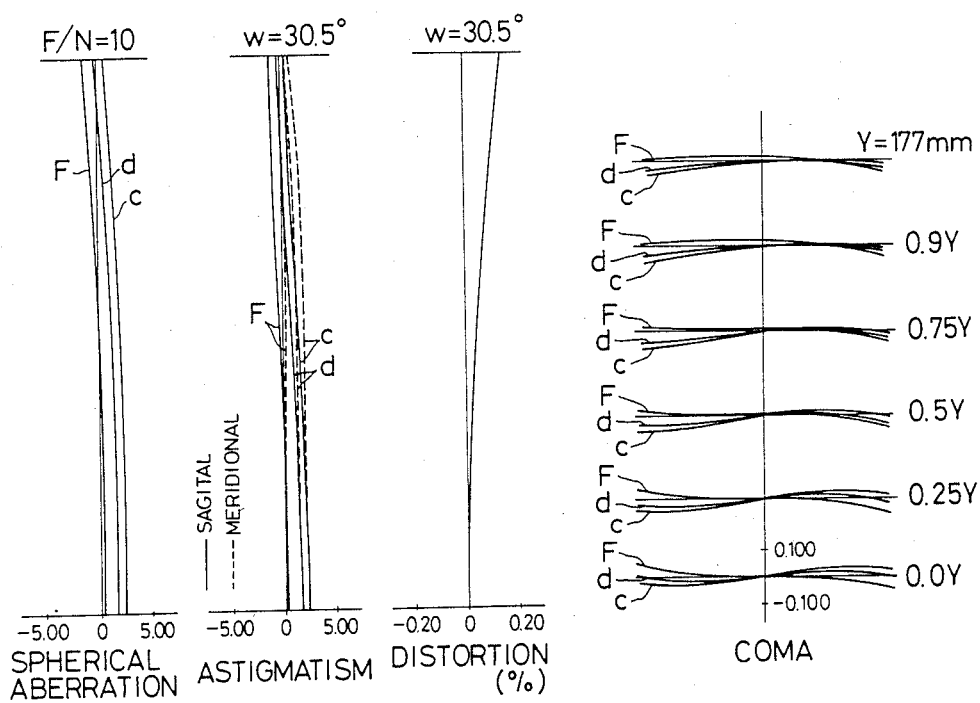
Figure 7:
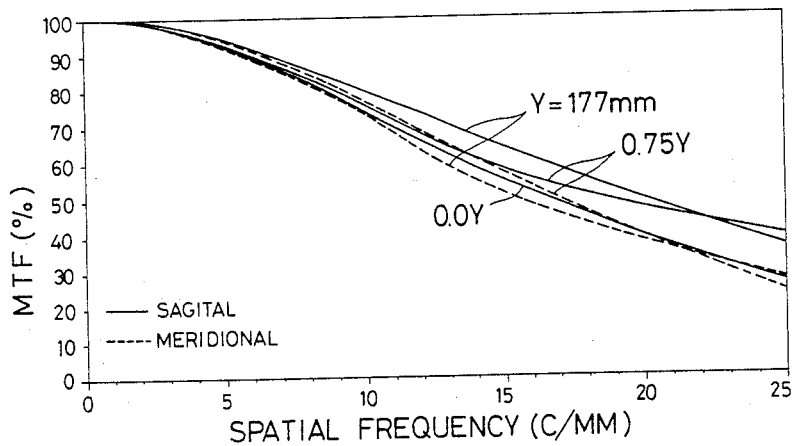
Figure 8:
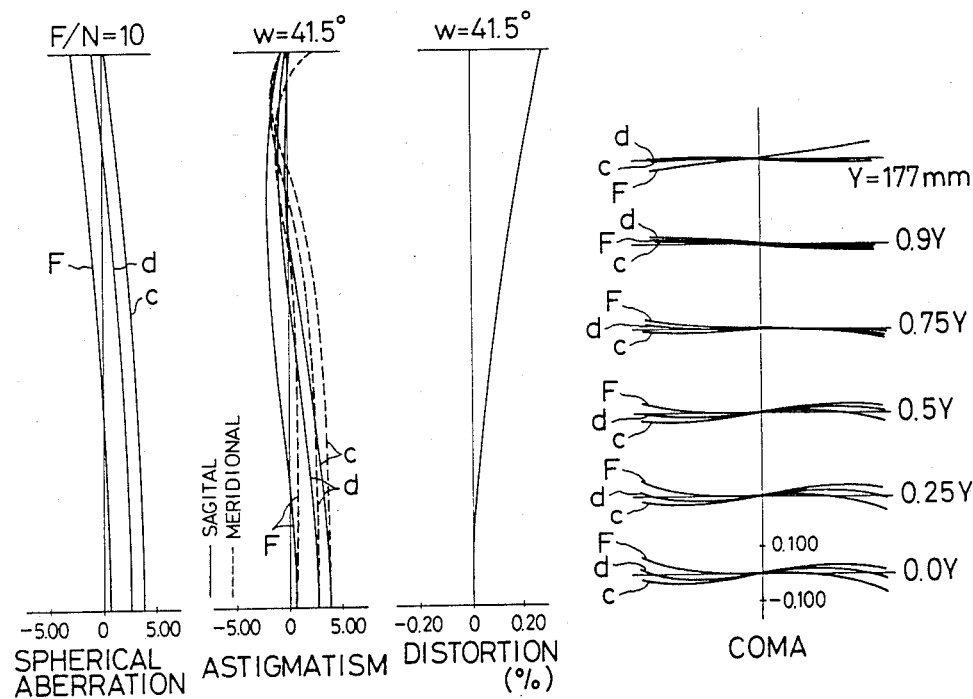
FIGS. 8 through 13 are abberation and MTF diagrams of Example 2, FIGS. 8 and 9 showing those on no size magnification, FIGS. 10 and 11 showing those on size enlargement, FIGS. 12 and 13 showing those on size reduction.
Figure 9:
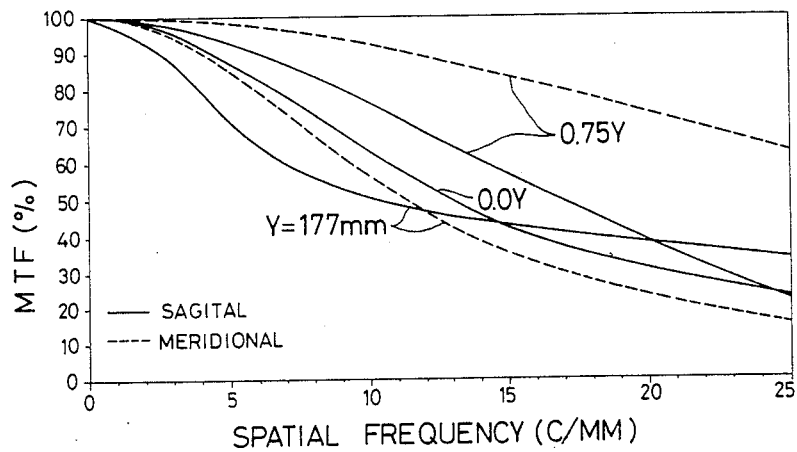
Figure 10:
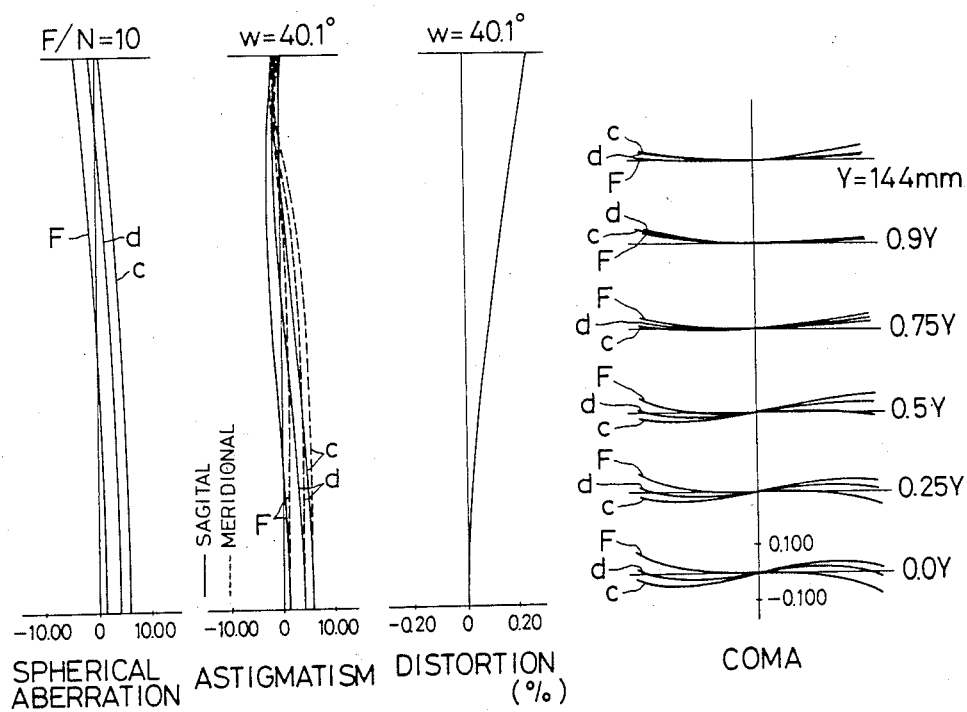
Figure 11:
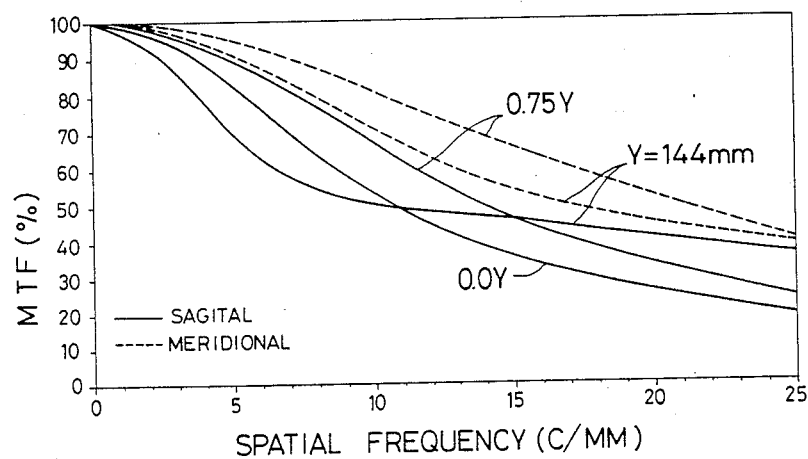
Figure 12:
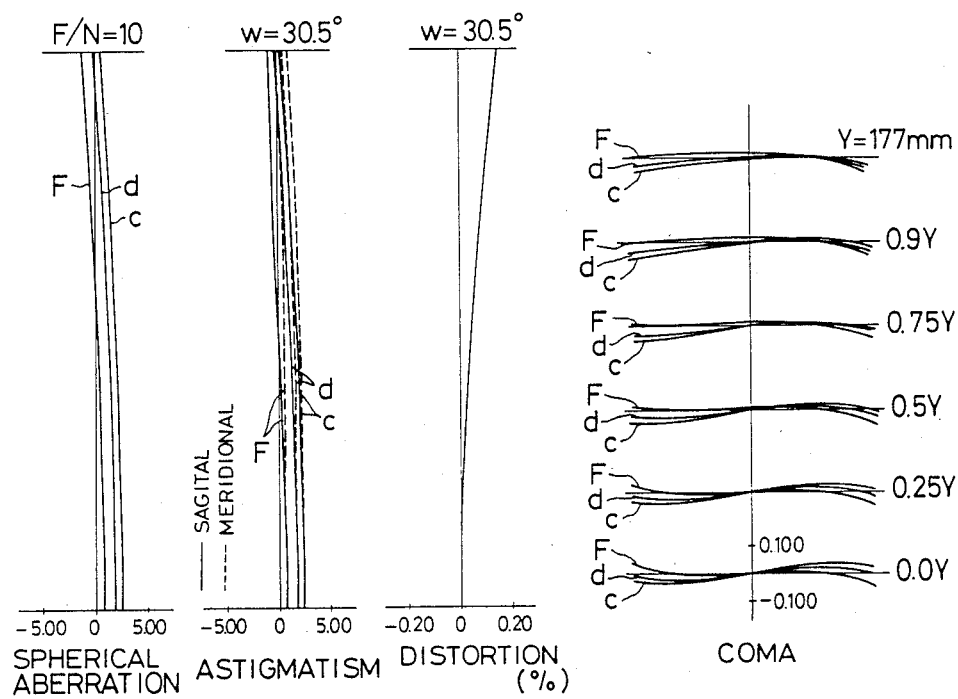
Figure 13:
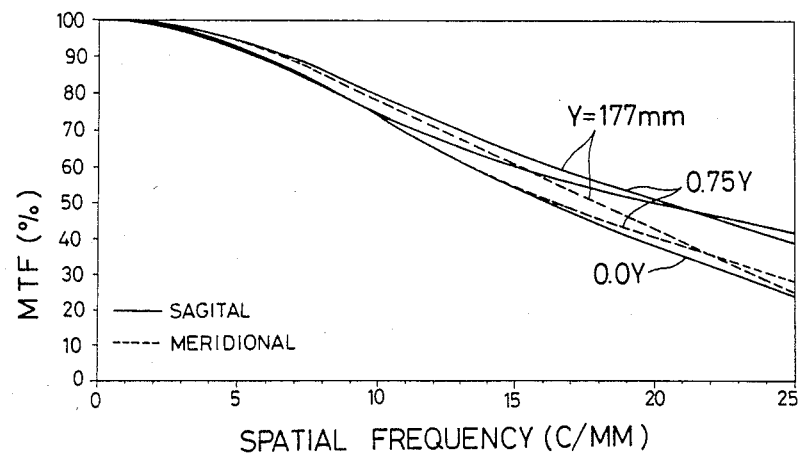
Figure 16:
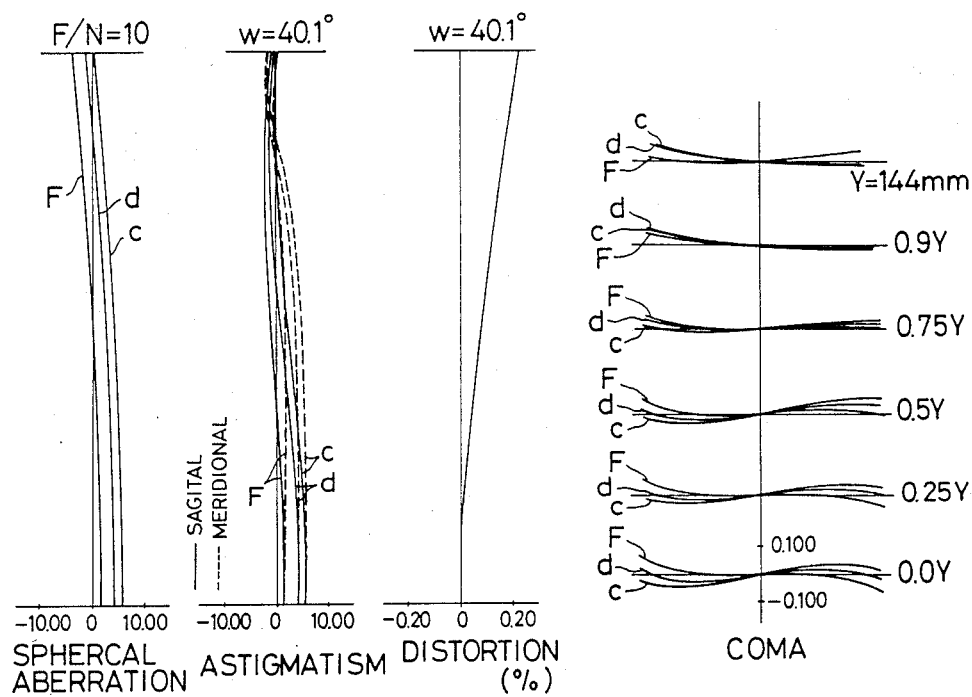
Figure 17:
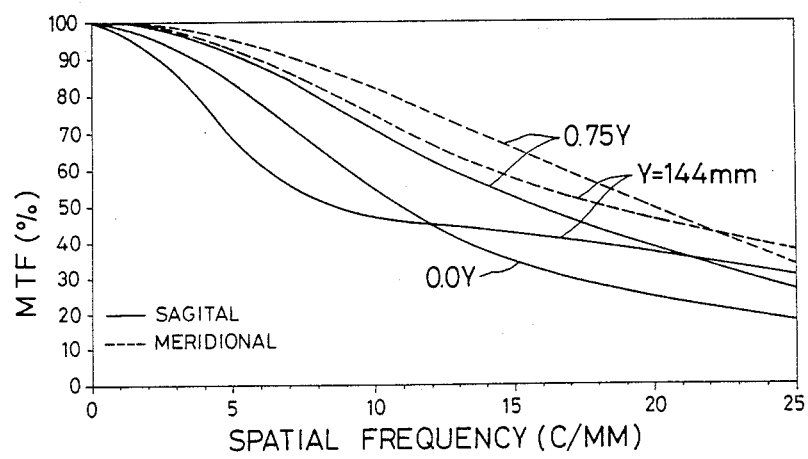
Figure 18:
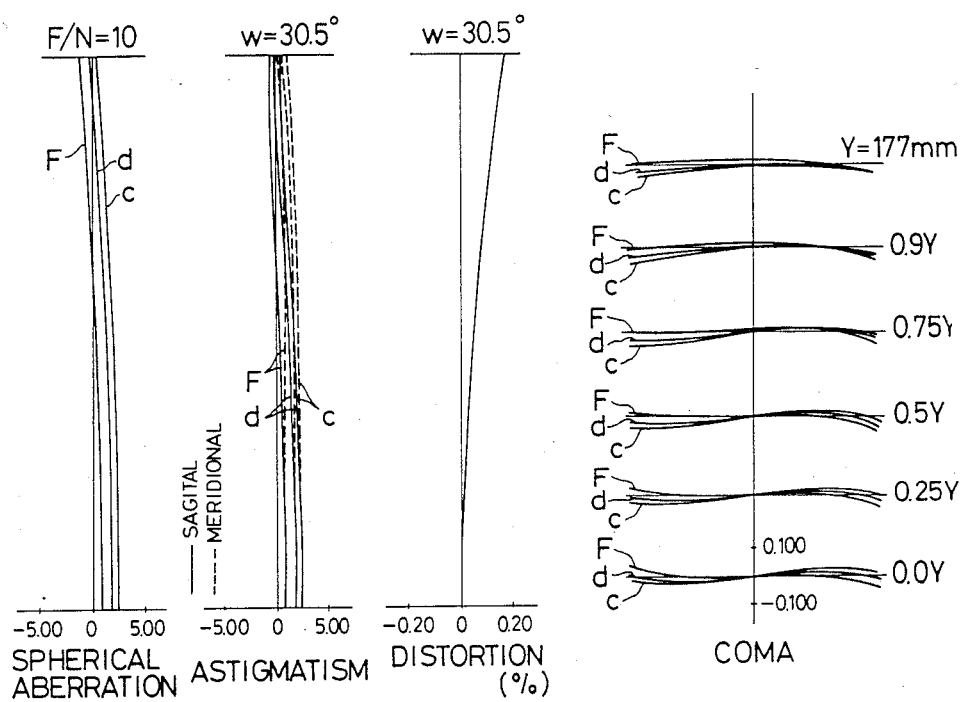
Figure 19:
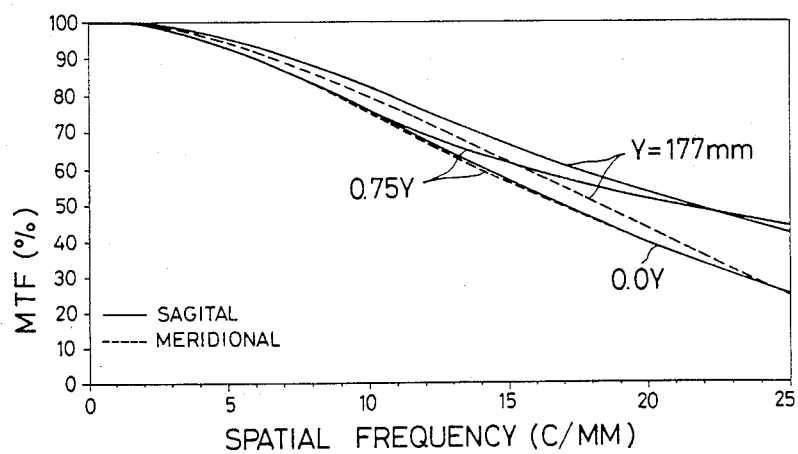
Figure 20:
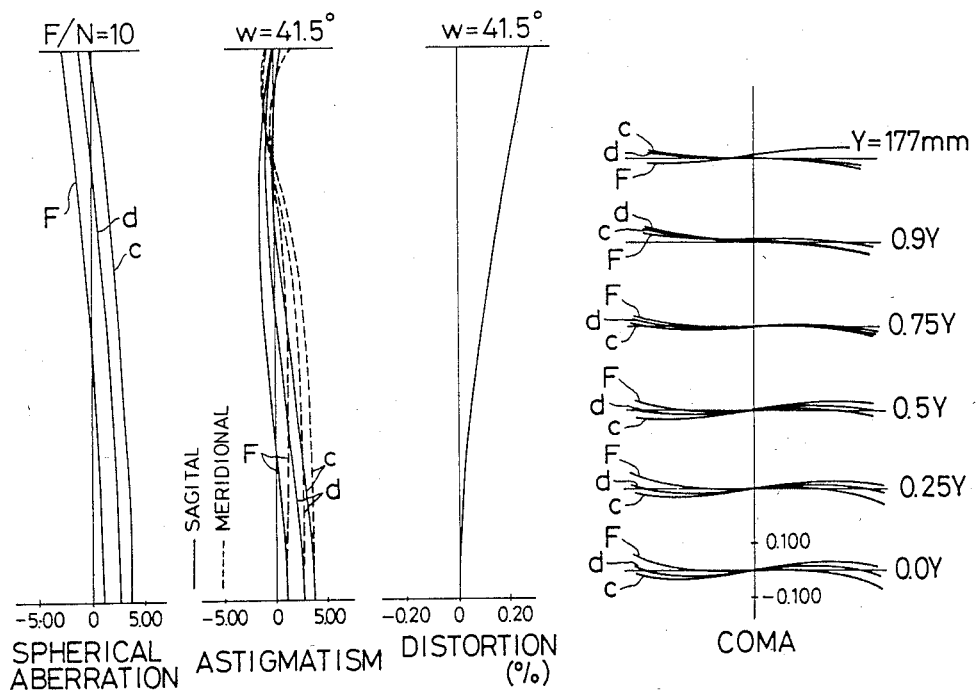
Figure 21:
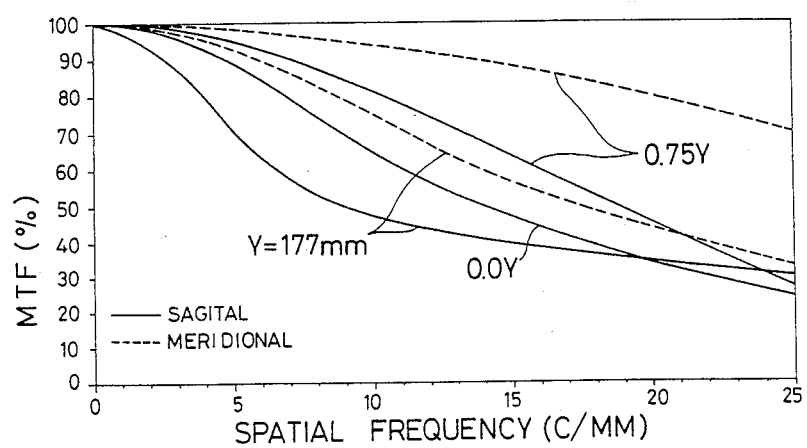
Figure 22:
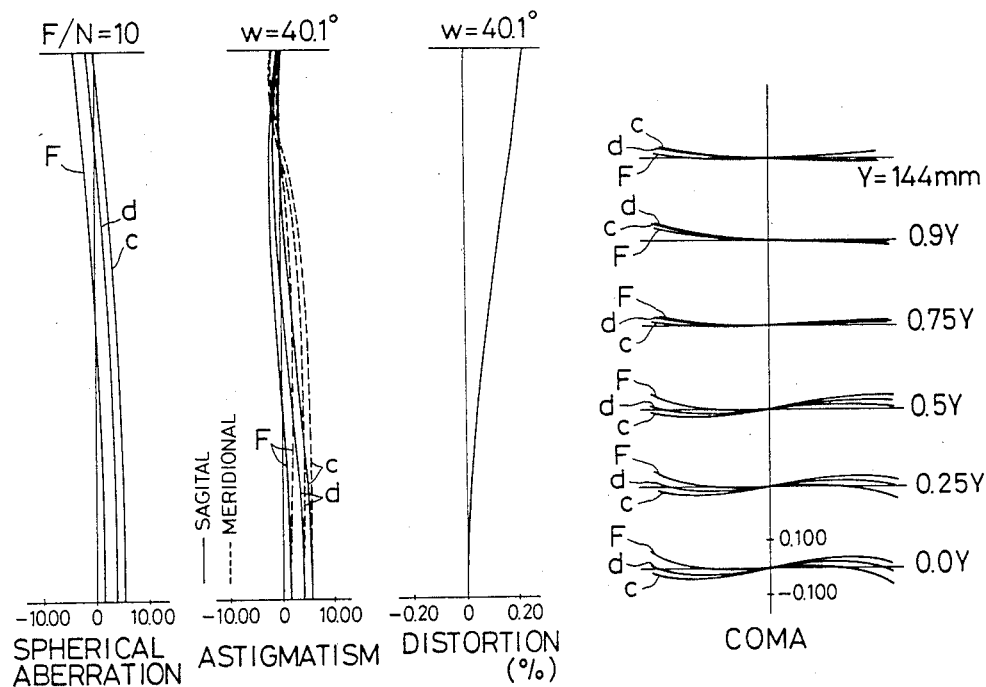
Figure 23:
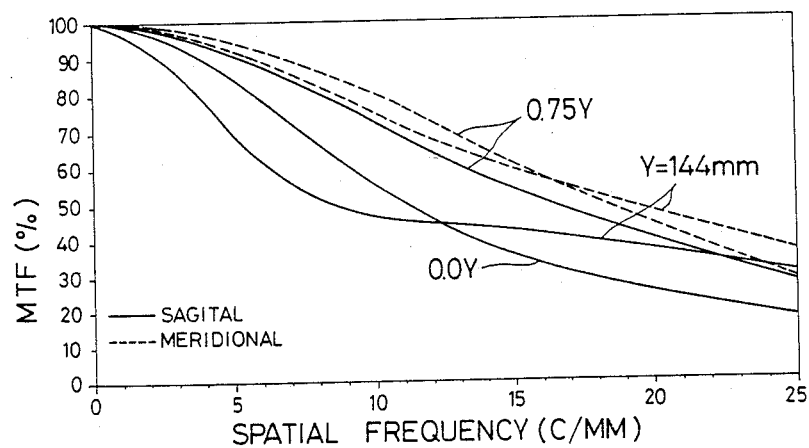
Figure 26:
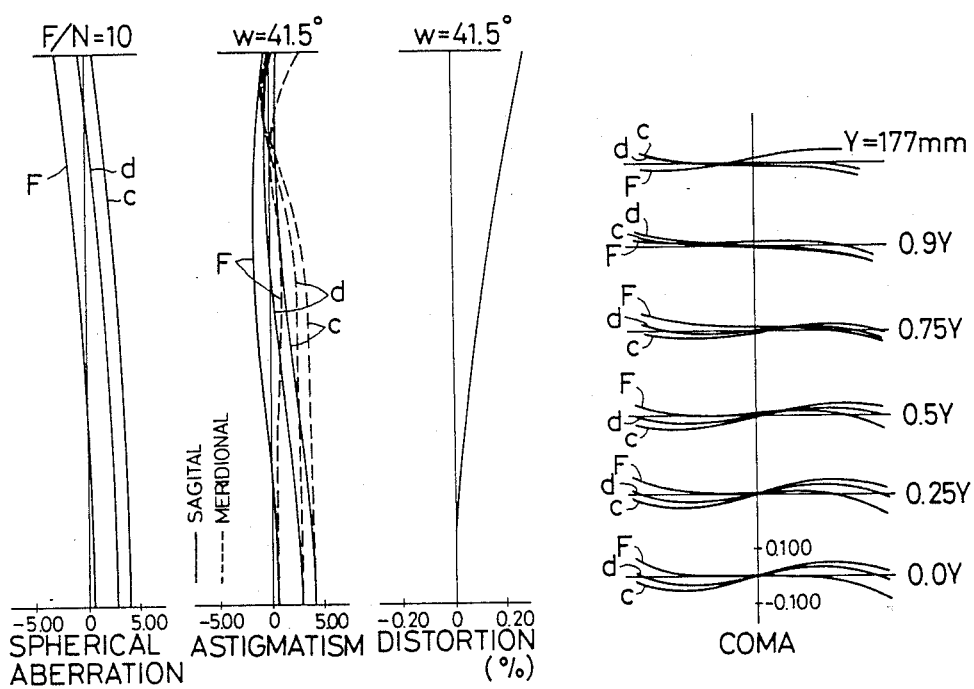
FIGS. 26 through 31 are abberation and MTF diagrams of Example 5, FIGS. 26 and 27 showing those on no size magnification, FIGS. 28 and 29 showing those on size enlargement, FIGS. 30 and 31 showing those on size reduction.
Figure 27:
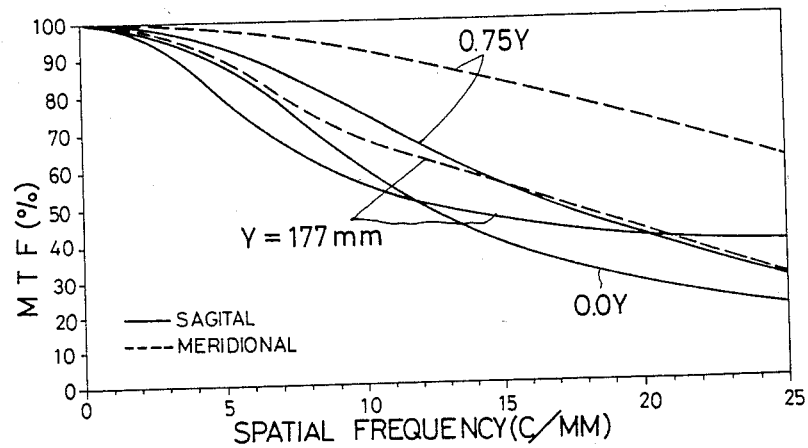
Figure 28:
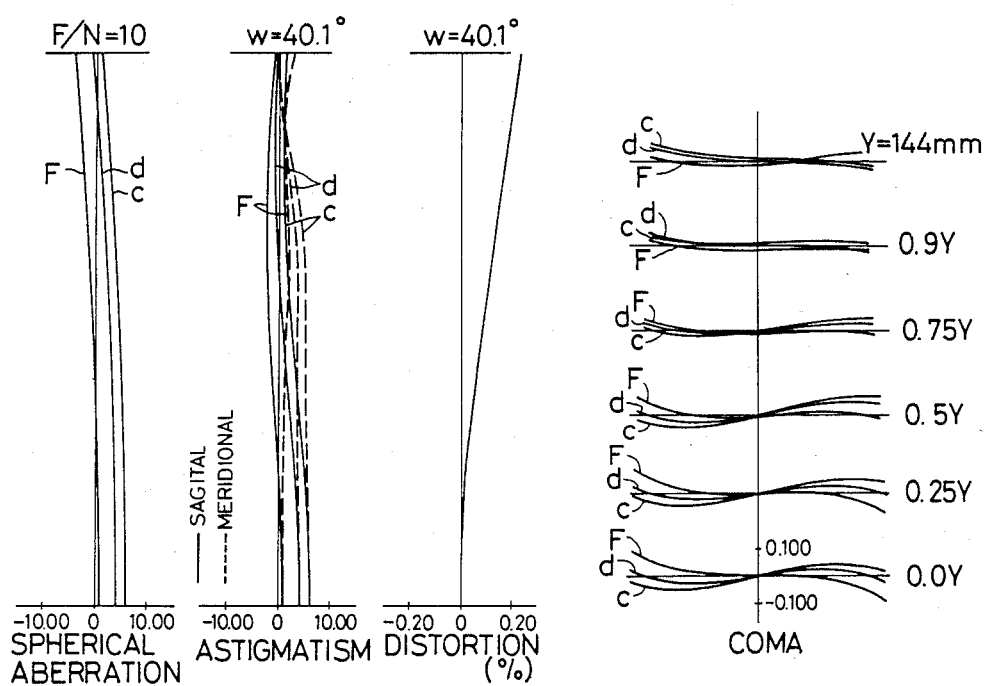
Figure 29:
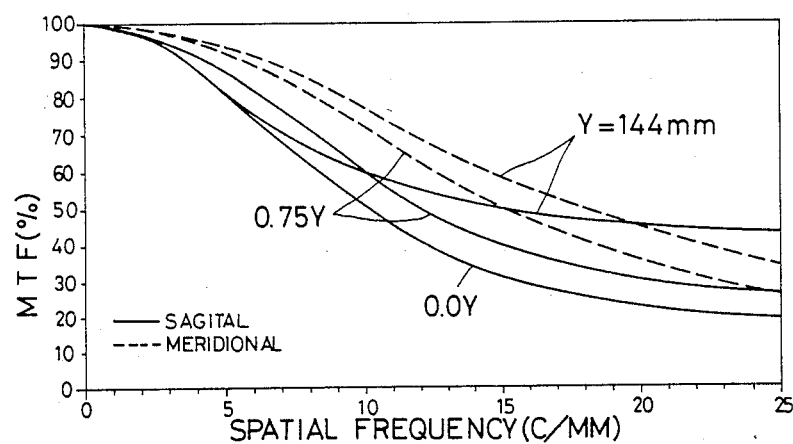
Figure 30:
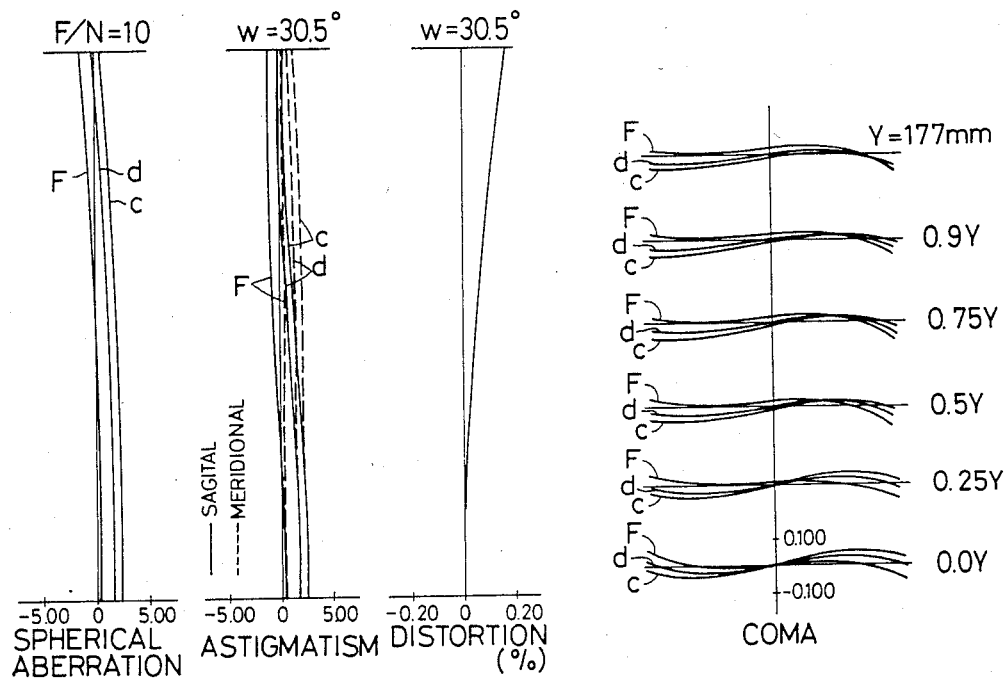
Figure 31:
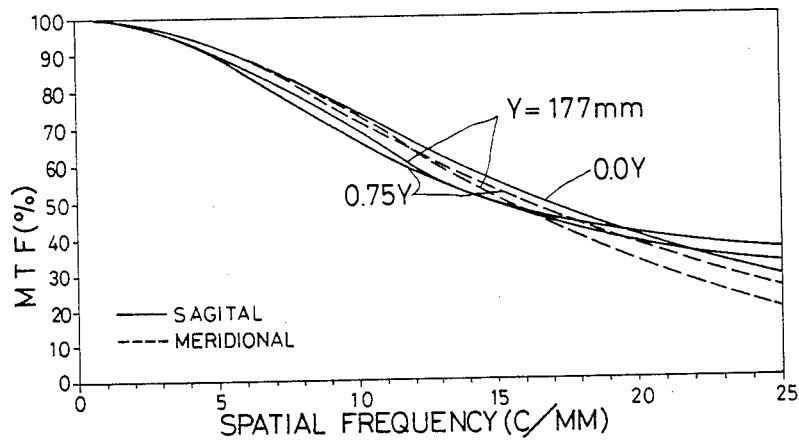
Figure 34:
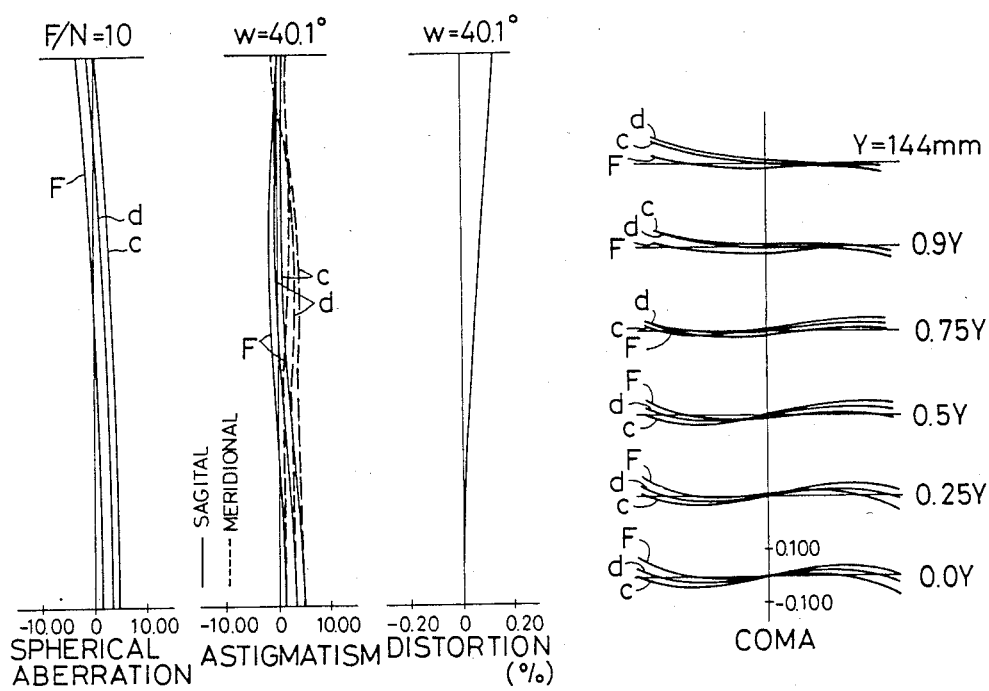
Figure 35:
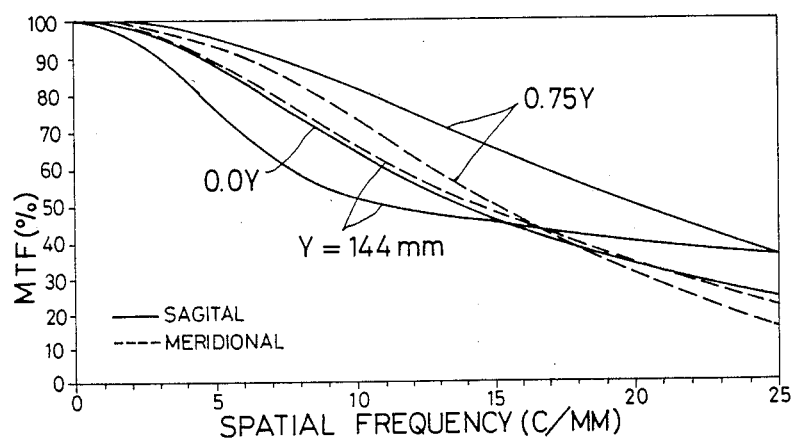
Figure 36:
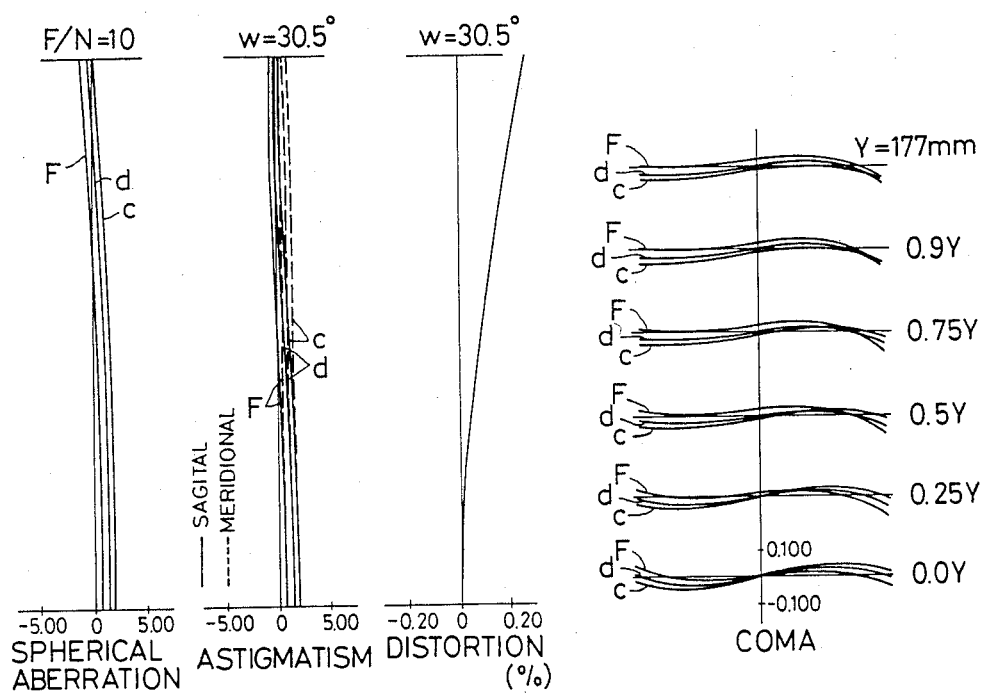
Figure 37:
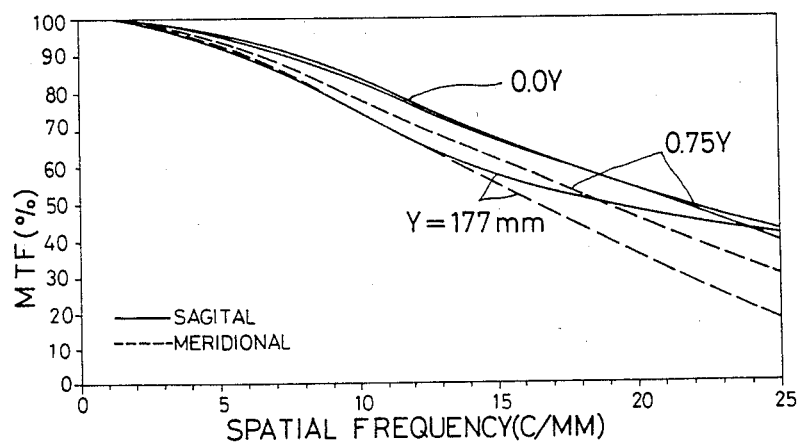

FIGS. 2 through 7 illustrate aberrations and MTF characteristics of Example 1, FIGS. 8 through 13 illustrate aberrations and MTF characteristics of Example 2, FIGS. 14 through 19 illustrate aberrations and MTF characteristics of Example 3, FIGS. 20 through 25 illustrate aberrations and MTF characteristics of Example 4, FIGS. 26 through 31 illustrate aberrations and MTF characteristics of Example 5, and FIGS. 32 through 37 illustrate aberrations and MTF characteristics of Example 6. In each of Examples 1 through 6, the first pair of the six diagrams shows aberrations and MTF characteristics plotted at the time the magnifying power is not varied, i.e., on no size magnification, the second pair shows those on size enlargement, and the third pair shows those on size reduction. For Example 1, for instance, FIGS. 2 and 3 show aberrations and MTF characteristics on no size magnification, FIGS. 4 and 5 show those on size enlargement, and FIGS. 6 and 7 show those on size reduction.

At the time of size enlargement, the magnifying power was 1.414, and at the time of size reduction, the magnifying power was 0.5.

With the copying lens of the present invention, as illustrated in FIGS. 2 through 37, the curvature of a saggital ray of astigmatism is reduced when the magnifying power is varied or not varied, the on-axis chromatic aberration and the chromatic aberration of the image plane are well corrected, and MTF remains high up to high spatial frequencies.

The half angle of view of the copying lens according to the present invention is 41.5° which is wide and has not been available in the prior art. Where the copying lens of the invention is employed in a copying machine of the full exposure time, the focal length can be of about 150 mm even if the copying machine is designed to be able to copy originals of A3 size. Therefore, the conjugate length can be shortened, and the optical path is not required to be bent, with the result that the copying machine can be smaller in size and lower in cost.

Any distortion which is generated by the contact lens plate due to the wide half angle of view in excess of 40° is reduced even in a wide magnifying-power range from ×1.414 to ×0.5. The distortion is small even without the contact glass plate. The copying lens of the invention can be used in a wide range of applications, such as a copying machine, an electrostatic copier, and the like.

Although a certain preferred embodiment has been shown and described, it should be understood that many changes and modifications may be made therein without departing from the scope of the appended claim.

What is claimed is:

1. A copying lens of a six-component, eight-element configuration comprising, in order from an object side, a first component composed of a convex-meniscus first lens having a convex surface directed toward the object side, a second component composed of a concave-meniscus second lens having a convex surface directed toward the object side, a third component composed of a double-convex third lens and a double-concave fourth lens which are joined to each other, an aperture stop, a fourth component composed of a double-concave fifth lens which is substantially the same as said fourth lens and a double-convex sixth lens which is substantially the same as said third lens, said fifth and sixth lenses being joined to each other, a fifth component composed of a concave-meniscus seventh lens which is substantially the same as said second lens and has a concave surface directed to the object side, and a sixth component composed of a convex-meniscus eighth lens which is substantially the same as said first lens and has a concave surface directed to the object side, said copying lens being completely symmetrical with respect to said aperture stop and meeting the following five conditions:

(i) $0.45 < f/f_{1,2} < 0.6$
(ii) $0.1 < f/f_{3,4} < 0.25$
(iii) $0.1 < n_4 - n_3 < 0.3$
(iv) $15 < \nu_3 - \nu_4 < 30$
(v) $1.70 < n_1$
    $50 < \nu_1$ where f: the combined focal length of the overall lens system,
$f_{1,2}$: the combined focal length of the first lens (eighth lens) and the second lens (seventh lens),
$f_{3,4}$: the combined focal length of the third lens (sixth lens) and the fourth lens (fifth lens),
$n_i$: the reflective index of the ith lens, and
$\nu_i$: the Abbe number of the ith lens.

* * * * *